J. OSTANEK.
CULTIVATOR.
APPLICATION FILED JAN. 26, 1920.

1,357,649.

Patented Nov. 2, 1920.
2 SHEETS—SHEET 1.

Inventor:
J. Ostanek.
by A. M. Wilson.

J. OSTANEK.
CULTIVATOR.
APPLICATION FILED JAN. 26, 1920.

1,357,649.

Patented Nov. 2, 1920.
2 SHEETS—SHEET 2.

Inventor
J. Ostanek

By A. M. Wilson
Attorney

UNITED STATES PATENT OFFICE.

JOHN OSTANEK, OF CHATHAM, MICHIGAN.

CULTIVATOR.

1,357,649.   Specification of Letters Patent.   Patented Nov. 2, 1920.

Application filed January 26, 1920. Serial No. 354,110.

*To all whom it may concern:*

Be it known that I, JOHN OSTANEK, a citizen of Jugo-Slavia, residing at Chatham, in the county of Alger and State of Michigan, have invented certain new and useful Improvements in Cultivators, of which the following is a specification.

The primary object of the invention is to provide a cultivating machine in which the supporting frame carries for vertical adjustment therein, a plurality of plows so that the plows may be elevated to inoperative position during transportation of the machine when not engaged in cultivating.

Figure 1:
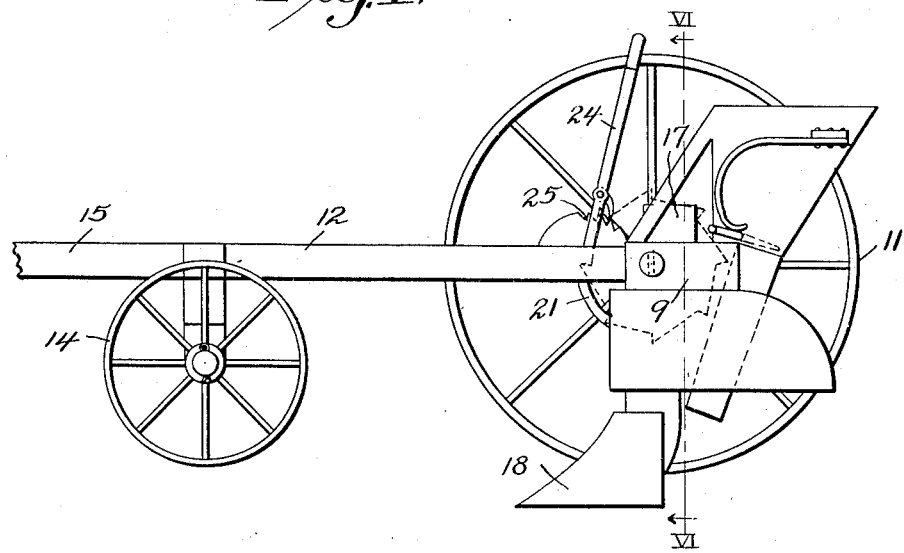
Figure 2:
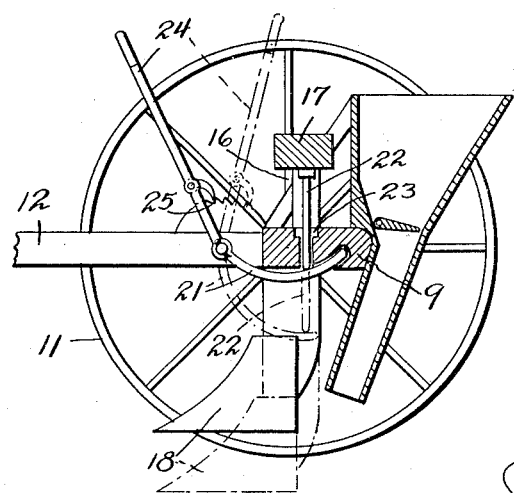
Figure 3:
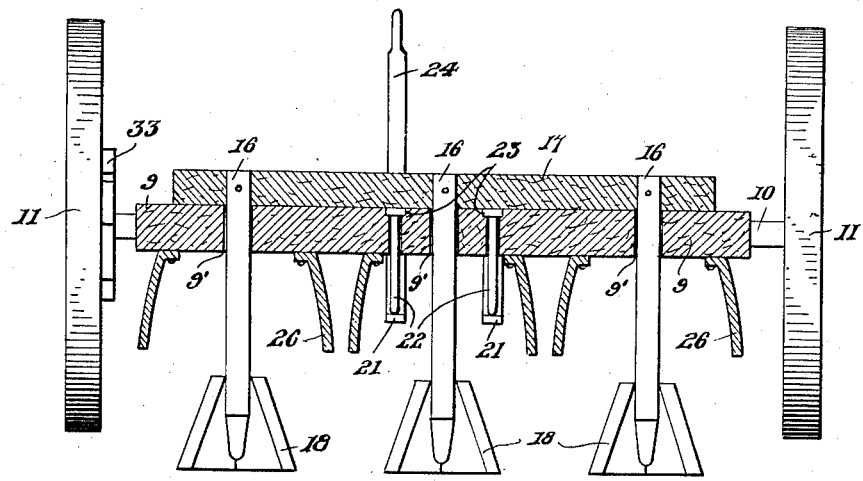
Figure 4:
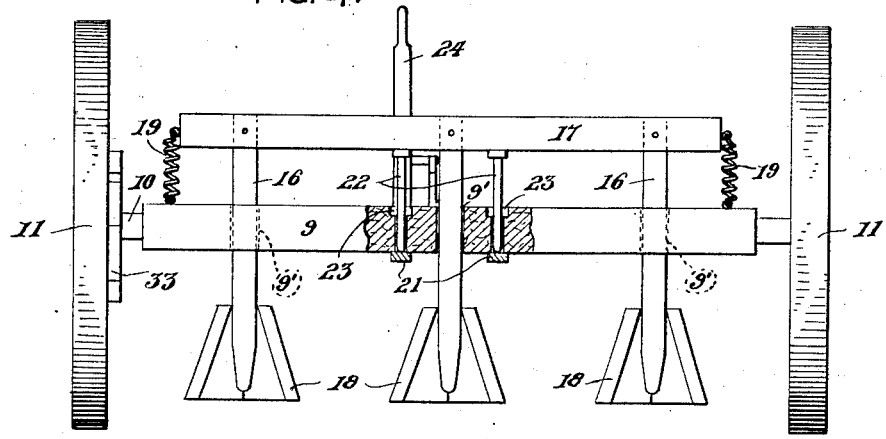

In the drawings, wherein like reference characters indicate similar parts throughout the several views, Figure 1 is a side elevational view of a cultivator constructed in accordance with the present invention, Fig. 2 is a vertical cross sectional view showing in dotted lines the plows elevated to their inoperative positions, Fig. 3 is a vertical sectional view taken on line VI—VI of Fig. 1 showing the plows in their lower position, Fig. 4 is a rear elevational view, partially in section, showing the plows elevated.

Referring more in detail to the accompanying drawings, there is illustrated a cultivating machine formed of a frame structure comprising a rear transverse frame bar 9, having a stub axle 10 at each end for supporting the main rear ground wheels 11, while forwardly converging brace bars 12 are connected at their forward ends to a transverse bar 13 for rotatably supporting upon each end, a relatively small ground wheel 14 as shown more clearly in Fig. 1. A draft beam 15 extends from the rear cross bar 9 forwardly of the forward cross bar 13 to which draft animals may be attached.

Plows are associated with the transverse frame bar 9 and being arranged in series, each includes a vertically adjustable shank 16 freely extending through openings 9' in the bar 9 and connected at its upper end to the vertically movable bar 17 while substantially V-shaped plows 18 are carried on the lower ends thereof. As shown in Fig. 4, coil springs 19 extending between the connecting rod 17 and the transverse bar 9 maintain the connecting bar lowered with the plows in their operative positions.

Means is provided for elevating the plows and connecting bar 17 against the tension of the springs 19 to raise the plows to their inoperative positions, and is more clearly shown in Figs. 2, 3, and 4 as embodying a rod 20 journaled transversely of the rear end of the draft beam 15 and carrying rearwardly directed curved arms 21 underlying the pins 22 depending from the connecting rod 17 and freely extending through openings 23 in the transverse bar 9. An operating lever 24 is fixed to the rod 20 for shifting the curved arms 21 to elevate the connecting rod 17 and plows through the medium of the curved arms 21 and pins 22, while a pawl and segment lock 25 maintains the plows in their elevated positions.

Covering blades 26 are secured to the under side of the transverse bar 9 as shown in Fig. 1 and are adapted for replacing the earth in the furrow after depositing the potatoes.

What is claimed as new is:

1. A machine of the type described comprising a frame bar, plows vertically adjustable therein, a connecting bar for said plows, pins depending from said connecting bar and slidably extending through said frame bar, and means for engaging said pins to elevate the connecting bar and plows.

2. A machine of the type described comprising a transverse frame bar, a vertically movable bar normally resting upon said transverse frame bar, plows vertically adjustable through said frame bar and connected to the movable bar, pins carried by the movable bar and freely projecting downwardly through the frame bar, and a lever having curved lower ends underlying said pins and adapted to be operated to engage the pins vertically to shift the movable bar and plows.

In testimony whereof I affix my signature.

JOHN OSTANEK.